(12) United States Patent
Johnston et al.

(10) Patent No.: US 6,305,505 B1
(45) Date of Patent: Oct. 23, 2001

(54) REDUCED FRICTION WET DISC BRAKE

(75) Inventors: Paul M. Johnston, Troy, MI (US);
Yngve Naerheim, Thousand Oaks, CA (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/491,743

(22) Filed: Jan. 27, 2000

(51) Int. Cl.[7] ................................................. F16F 55/02
(52) U.S. Cl. ..................... 188/71.2; 188/264 E; 188/170; 192/86
(58) Field of Search .................. 188/71.2, 71.4, 188/71.5, 170, 72.3, 264 E, 264 F, 264 R, 264 G, 264 CC; 192/86, 91 R, 58.43

(56) References Cited

U.S. PATENT DOCUMENTS

| 3,166,167 | * | 1/1965 | Kinsman | 192/18 |
| 3,862,675 | * | 1/1975 | Blatter et al. | 188/181 R |
| 4,287,978 | * | 9/1981 | Staub, Jr. | 192/113 B |
| 4,901,830 | * | 2/1990 | Dolby | 192/18 A |
| 5,123,508 | * | 6/1992 | Pederson | 192/18 A |
| 5,174,420 | * | 12/1992 | DeWald et al. | 188/264 E |
| 5,207,305 | * | 5/1993 | Iverson | 192/58 C |
| 5,253,737 | * | 10/1993 | Klaue | 188/71.5 |
| 6,095,298 | * | 8/2000 | Kinsman | 192/18 |

* cited by examiner

Primary Examiner—Robert J. Oberleitner
Assistant Examiner—Bradley King
(74) Attorney, Agent, or Firm—Carlson, Gaskey & Olds

(57) ABSTRACT

An improve wet disc brake incorporates a two part rotating disc. One of the two parts is selectively rotatable, and the other part is constantly rotating with the rotor. The rotor carries an air supply which creates an air bearing between the constantly rotating disc portion and the selectively rotating disc portion. During non-braking operation the air bearing maintains the selectively rotating portion out of contact with the rotating portion. Fluids other than air may be used. The selectively rotating portion thus remains stationary within the wet disc brake chamber, reducing frictional losses. When braking is desired, the flow of air to the air bearing is stopped. A bias force forces the selectively rotating portion into contact with the constantly rotating portion. Then, braking does occur by operation of the stator discs to move towards contact with the rotor discs.

15 Claims, 1 Drawing Sheet

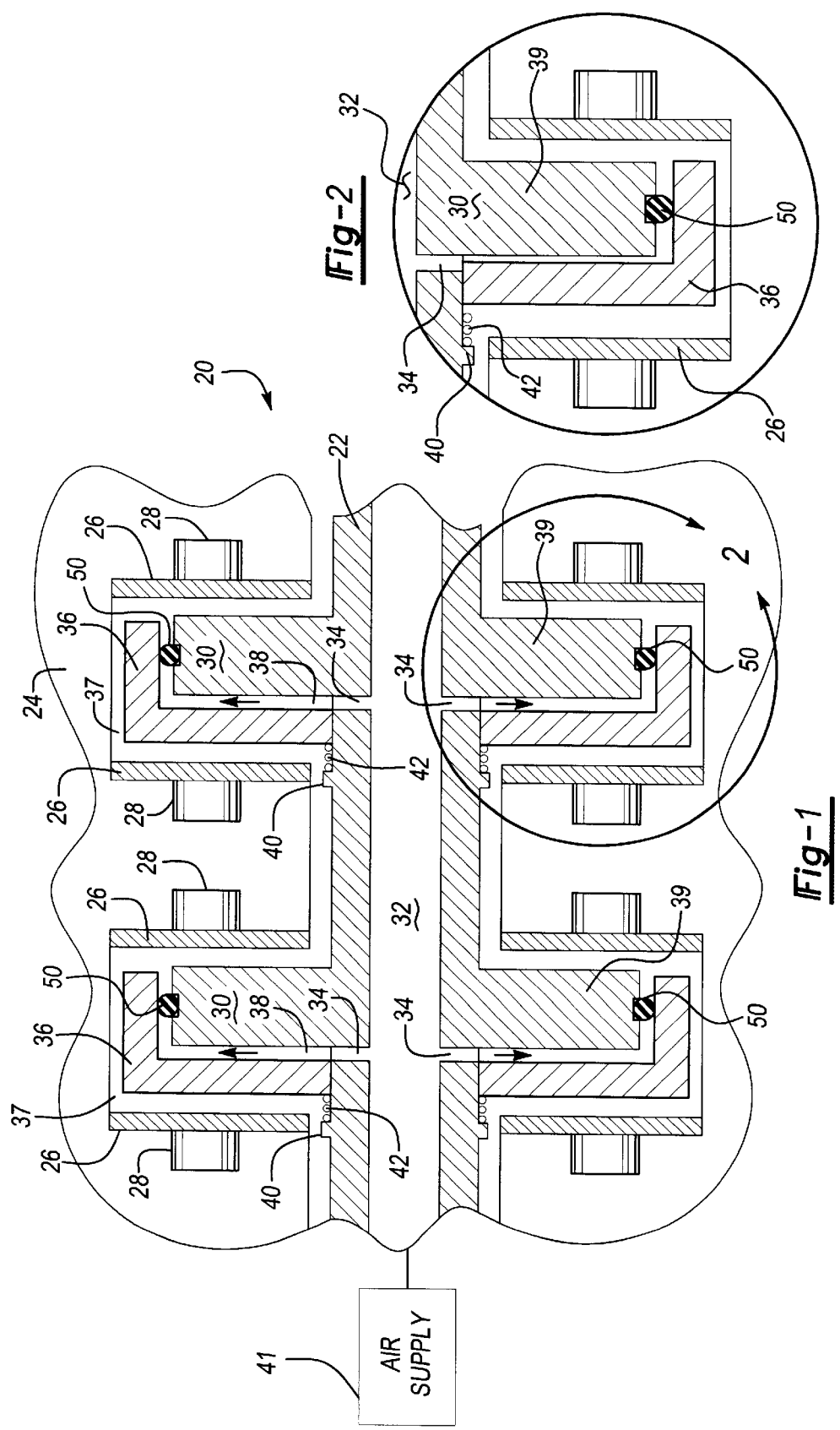

REDUCED FRICTION WET DISC BRAKE

BACKGROUND OF THE INVENTION

This invention relates to a wet disc brake wherein the friction losses during non-braking time periods are greatly reduced when compared to the prior art.

Wet disc brakes are utilized in many heavy braking applications. In a typical wet disc brake, a rotor, is connected to a wheel, or shaft to be braked. The rotor includes disc portions which are rotating within a viscous fluid filled chamber. A stator surrounds the rotor disc portions. The stator includes discs which are selectively driven into contact with the rotor discs. The friction between the stator discs and the rotor discs slows rotation of the rotating stator. The rotor discs also rotate when braking is not occurring within the viscous fluid. This results in relatively high friction losses during non-braking time periods as the rotor discs rotate within the fluid.

The present invention is directed to a unique method of reducing these friction losses.

SUMMARY OF THE INVENTION

In a disclosed embodiment of this invention, the rotor disc is comprised of two parts, wherein a free part remains stationary within the fluid during non-braking times. When braking does occur, the free part is brought into contact with a rotating disc part, and rotates with the rotor. In this way, friction losses are greatly reduced. In a disclosed embodiment of this invention, the rotor carries a supply of a fluid. The fluid is directed to create a fluid bearing between the free part and the rotating part of the disc. This fluid bearing allows the free part to remain stationary within the fluid chamber relative to the rotating disc part.

When the rotor is rotating, and braking is not occurs fluid is directed to the fluid bearing. Thus, the free part is biased away from the rotating part, and it does not rotate. Instead, the free part remains stationary within the fluid chamber and there is greatly reduced friction between the rotor disc and the fluid in the chamber.

However, when braking does occur, the flow of fluid to the fluid bearing is stopped. A bias, such as a spring, biases the free part back into contact with the rotating part. The two then rotate as a unit. At that time, the discs on the stator are also actuated to engage the rotor discs, and slow rotation of the rotating part.

The present invention thus discloses a unique method of reducing friction losses within a wet disc brake. These and other features of the present invention can be best understood from the following specification and drawings. The following is a brief description of the drawing.

BRIEF DESCRIPTION OF THE DRAWINGS

FIG. 1 shows a first stage of operation of an inventive wet disc brake, wherein braking is not occurring.

FIG. 2 shows a portion of the brake of FIG. 1 at a time when braking is occurring.

DETAILED DESCRIPTION OF A PREFERRED EMBODIMENT

A wet disc brake 20 incorporates a rotor 22 rotating within a stator portion 24. As known, the stator portion carries friction discs 26 which are selectively actuated by pistons 28 to bring the discs 26 adjacent to rotor discs 30 which rotate with the rotor shaft 22. The stator 24, discs 26 and pistons 28 are shown rather schematically. At that time, friction between the discs 26 and the rotor discs 30 slow rotation of discs 30, and hence the rotor 22. As is known, rotor 22 is connected to a component such as a wheel, and when rotation of rotor 22 is slowed, rotation of the wheel also slows. The above generally describes the normal operation of a wet disc brake. However, the structure and operation of the rotating disc 30 in the instant invention is different from the prior art as will now be explained. A central fluid supply 32 extends along the shaft portion of the rotor 22. Selective fluid jets 34 extend radially outwardly to a chamber 38 between a selectively rotating free part 36 of the rotor disc 30, and the rotating part 39. These jets create a fluid bearing between parts 36 and parts 39. While only two jets 34 are shown at each disc 30, it should be understood that additional jets may be spaced circumferentially from the illustrated jets.

As shown, a spring stop 40 provides a stop surface for a spring 42 which biases free part 36 towards part 39. This schematically shows that the part 36 is biased into contact with the part 30; however, other bias arrangements may be utilized to achieve this bias.

Disc 30 rotates within a chamber 37 filled with a viscous fluid, as is known in wet disc brakes. During normal operation of the system, wherein braking is not occurring, air is directed from an air supply 41 into the path 32, and then to the jets 34. Air bearings 38 are created, and the parts 36 are biased away from the parts 39. Although air is disclosed for bearings 38, other fluids may be used. Thus, parts 36 remains stationary within the fluid 37, and there is no resulting frictional losses. Seals 50 separate bearings 38 from chamber 37. Preferably, the seals 50 are low friction. There may be some frictional loss from the rotating disc part 39; however, this will be greatly reduced when compared to the prior art, as is apparent from a simple comparison of the areas over which the frictional losses will occur as is shown in FIG. 1.

As shown FIG. 2, when it is desired to achieve braking, the supply of air from the supply 41 is stopped. The bias member 42 now biases part 36 towards part 30. At the same time, or soon thereafter, the pistons 28 are actuated to drive the discs 26 towards the combined discs 30 (i.e., parts 36 and 39). The frictional contact between the discs 26 and discs 30, and the friction from the viscous fluid 37 within the chamber combine to slow rotation of the disc 30.

As an alternative, a second free part, similar to part 36 with a similar air bearing can be placed on the right hand side of part 39. This will further reduce the friction losses.

Although a preferred embodiment of this invention has been disclosed, a worker in this art would recognize that certain modifications would come within the scope of this invention. Thus, the following claims should be studied to determine the true scope and content of this invention.

What is claimed is:

1. A wet disc brake comprising:

a stator;

a rotor, said rotor and said stator together defining a fluid chamber;

a viscous first fluid received within said fluid chamber; and said rotor having at least one disc rotating within said chamber, said rotor disc being comprised of at least two parts, with a first part rotating with said rotor, and a second part selectively rotating with said rotor, said rotor being provided with a supply of a second fluid to create a fluid bearing between said first and second parts, and said fluid bearing stopping rotation of said second part with said first part.

2. A wet disc brake as recited in claim 1, wherein said fluid bearing is provided by a control that stops supply of fluid to said fluid bearing when it is desired to slow rotation of said rotor.

3. A wet disc brake as recited in claim 1, wherein said stator surrounds said rotor.

4. A wet disc brake as recited in claim 1, wherein said second part is spring biased into contact with said first part, and said bias is overcome by said fluid bearing.

5. A wet disc brake as recited in claim 1, wherein said fluid bearing is provided by an air bearing.

6. A wet disc brake as recited in claim 1, wherein said rotor includes a central shaft with said rotor disc positioned outwardly of said central shaft, and a fluid supply path extending along an axis of said shaft, said fluid bearing including plural bearings, supply jets extending radially outwardly from said supply path to an outer peripheral surface of said rotor, to supply fluid to said fluid bearings.

7. A wet disc brake as recited in claim 6, wherein there are a plurality of said jets for said fluid bearing.

8. A wet disc brake as recited in claim 1, wherein each of said two parts of said rotor being mounted on a shaft, with said first part being connected for rotation with said rotor, and said second part selectively rotating with said rotor, but said second part being axially movable along said shaft for selective rotation.

9. A wet disc brake as recited in claim 1, wherein pistons selectively move a braking disc into contact with said second part of said rotor.

10. A wet disc brake comprising:

a stator;

a rotor, said rotor and said stator together defining a fluid chamber;

a viscous first fluid received within said fluid chamber; and said rotor having a plurality of discs rotating within said chamber, each said rotor disc being comprised of at least two parts, with a first part rotating with said rotor, and a second part selectively rotating with said rotor, said rotor being provided with a supply of a second fluid to create a fluid bearing between said first and second parts, and said fluid bearing stopping rotation of said second part with said first part, a control controlling said supply of fluid to stop the supply of fluid to said fluid bearing when it is desired to slow rotation of said rotor, said stator surrounding said rotor, said second part being biased into contact with said first part, and said bias being overcome by said fluid bearing, and said rotor including a central shaft with said rotor discs being positioned outwardly of said central shaft, and a fluid supply path extending along an axis of said shaft, said supply jets extending radially outwardly from said supply path to an outer peripheral surface of said rotor, and between said first and second parts of said rotor discs, and there being a plurality of said jets for each of said fluid bearings.

11. A wet disc brake as recited in claim 10, wherein each of said two parts of said rotor being mounted on a shaft, with said first part being connected for rotation with said rotor, and said second part being selectively rotating with said rotor, but said second part being axially movable along said shaft for selective rotation.

12. A wet disc brake as recited in claim 10, wherein pistons selectively move a braking disc into contact with said second part of said rotor.

13. A wet disc brake comprising:

a stator;

a rotor, said rotor and said stator together defining a fluid chamber;

a viscous fluid received within said fluid chamber;

pistons for selectively bringing a braking disc into contact with said rotor to slow rotation of said rotor; and said rotor having at least one disc rotating within said chamber, said rotor disc being comprised of at least two parts, with a first part rotating with said rotor, and a second part selectively rotating with said rotor, said rotor being provided with a supply of a fluid to create a fluid bearing between said first and second parts, and said fluid bearing stopping rotation of said second part with said first part.

14. A wet disc brake as recited in claim 13, wherein each of said two parts of said rotor being mounted on a shaft, with said first part being connected for rotation with said rotor, and said second part being selectively rotating with said rotor, but said second part being axially movable along said shaft for selective rotation.

15. A wet disc brake as recited in claim 13, wherein said braking discs are brought into contact with said second part of said rotor.

* * * * *